US007136279B2

(12) United States Patent
Yu et al.

(10) Patent No.: US 7,136,279 B2
(45) Date of Patent: Nov. 14, 2006

(54) KEYBOARD MOUNTING SYSTEM

(75) Inventors: Weiming Yu, Shenzhen (CN); Xiao Zhong Jing, Shenzhen (CN)

(73) Assignees: Hong Fu Jin Precision Industry (Shenzhen) Co., Ltd., Shenzhen (CN); Hon Hai Precision Industry Co., Ltd., Tu-Cheng (TW)

( * ) Notice: Subject to any disclaimer, the term of this patent is extended or adjusted under 35 U.S.C. 154(b) by 400 days.

(21) Appl. No.: 10/817,281

(22) Filed: Apr. 1, 2004

(65) Prior Publication Data
US 2004/0201974 A1    Oct. 14, 2004

(30) Foreign Application Priority Data
Apr. 11, 2003    (TW) ............................. 92205667 U

(51) Int. Cl.
*G06F 1/16* (2006.01)
(52) U.S. Cl. .................................... 361/680
(58) Field of Classification Search ............ 361/680, 361/801, 683
See application file for complete search history.

(56) References Cited
U.S. PATENT DOCUMENTS
5,510,953 A    4/1996  Merkel 5,738,536 A * 4/1998 Ohgami et al. ............. 439/142
5,966,284 A   10/1999 Youn et al.
6,493,215 B1  12/2002 Chiang et al.

FOREIGN PATENT DOCUMENTS
TW    448346    8/2001

\* cited by examiner

*Primary Examiner*—Kamand Cuneo
*Assistant Examiner*—Ivan Carpio
(74) *Attorney, Agent, or Firm*—Wei Te Chung

(57) ABSTRACT

A mounting system for a keyboard (20) includes a chassis (10) defining first and second recessed portions (12, 16), a panel (30) received in the second recessed portion, and a retaining member (40). The keyboard is received in the first recessed portion with a front side thereof detachably engaged with the chassis at a front side of the first recessed portion. The retaining member includes a first beam (42) fastened to the chassis, and a second beam (44) engaged with a rear side of the panel so as to retain the panel in the second recessed portion. A front side of the panel releasably engages with a rear side of the keyboard. The keyboard is thus retained in the first recessed portion of the chassis.

20 Claims, 10 Drawing Sheets

KEYBOARD MOUNTING SYSTEM

BACKGROUND OF THE INVENTION

1. Field of the Invention

The present invention relates to component mounting systems, and particularly to a mounting system for readily mounting a keyboard to a chassis of a portable computer.

2. Related Art

Modern portable computers are required to be designed such that components thereof can be easily manufactured and assembled. A typical portable computer such as a notebook computer comprises a keyboard attached in a top surface of a chassis. The keyboard is conventionally attached to the chassis by a plurality of fasteners such as screws, which extend from a bottom portion of the chassis into mounting portions located at an underside of the keyboard. In doing so, the keyboard is placed in a receiving slot portion of the chassis. An LCD (liquid crystal display) monitor of the notebook computer must be closed up temporarily in order to position the keyboard in the receiving slot portion. The notebook computer is turned over so that upside down. The screws are then engaged in corresponding screw holes to fasten the keyboard to the chassis. A turning-over operation is required to install or remove the keyboard to or from every notebook computer. This makes the installation and removal of the keyboard unduly laborious.

Taiwan Pat. Pub. No. 448346 discloses an improved keyboard mounting apparatus. One end of the keyboard is pivotably attached to a side of a keyboard receiving area of a notebook computer chassis. A mounting apparatus is located at an opposite side of the keyboard receiving area. An end of mounting apparatus is connected to the keyboard receiving area via a compressed spring. A catch is formed at an opposite end of the mounting apparatus. When an opposite end of the keyboard is pivoted down to the opposite side of the keyboard receiving area, the catch snappingly engages with the keyboard at the opposite end thereof to thereby retain the keyboard in the keyboard receiving area. After disengaging the catch from the keyboard, the keyboard can be easily removed from the keyboard receiving area. However, additional elements such as the catch and the spring are included in this mounting apparatus. This necessitates a more complicated structure and higher manufacturing costs.

Thus, a new mounting system for attaching a keyboard to a portable computer which overcomes the above-mentioned problems is desired.

SUMMARY OF THE INVENTION

Accordingly, an object of the present invention is to provide an inexpensive keyboard mounting system for readily attaching a keyboard to a portable computer chassis such as a notebook computer chassis.

To achieve the above-mentioned objects, a keyboard mounting system in accordance with a preferred embodiment of the present invention comprises a portable computer chassis defining first and second recessed portions, a keyboard received in the first recessed portion, a panel received in the second recessed portion, and a retaining member fastened to a rear portion of the chassis. The keyboard comprises a plurality of protrusions at a front side thereof and a peripheral lip at a bottom portion thereof. The chassis defines a plurality of locating holes receiving the protrusions therein respectively. A bar extends along a front side of the second recessed portion. The bar defines a plurality of apertures in a bottom thereof, and a pair of gaps therein. The panel at a front side thereof comprises a pair of stop tabs extending through the gaps to engage with the peripheral lip of the keyboard, and a plurality of ears received in the apertures of the bar. A plurality of projections extends rearward from a rear side of the panel. The retaining member comprises a first beam fastened to a rear outer face of the chassis, and a second beam defining a plurality of cavities engagingly receiving the projections of the panel therein respectively to retain the panel in the second recessed portion, thereby retaining the keyboard in the first recessed portion.

Other objects, advantages and novel features of the present invention will be drawn from the following detailed description of the preferred embodiment of the present invention with the attached drawings, in which:

DESCRIPTION OF THE PREFERRED EMBODIMENTS

Figure 1:
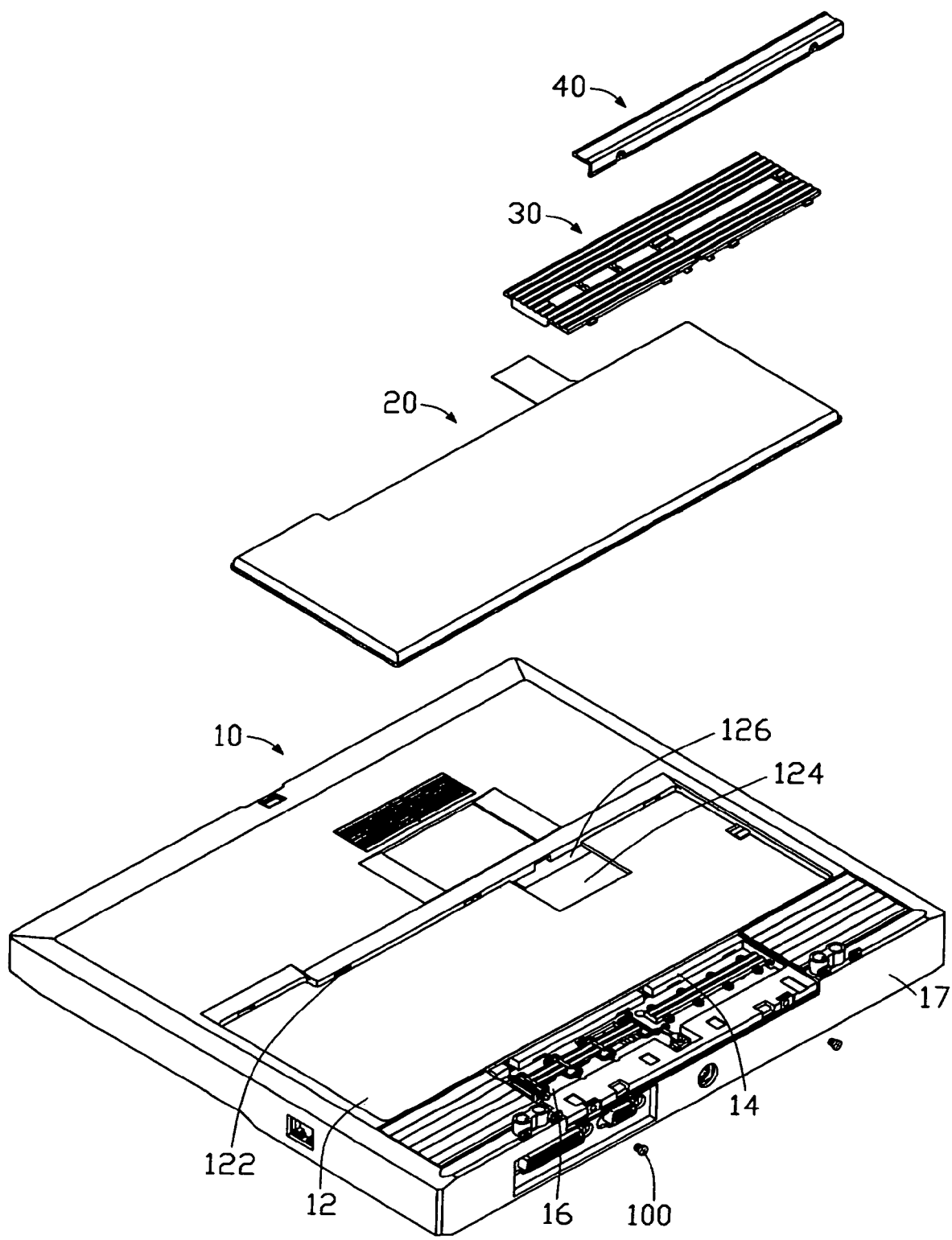
FIG. 1 is an exploded, isometric view of a keyboard mounting system in accordance with the preferred embodiment of the present invention, the mounting system comprising a chassis of a notebook computer, a keyboard, a panel, a retaining member and a pair of fasteners.
Figure 2:
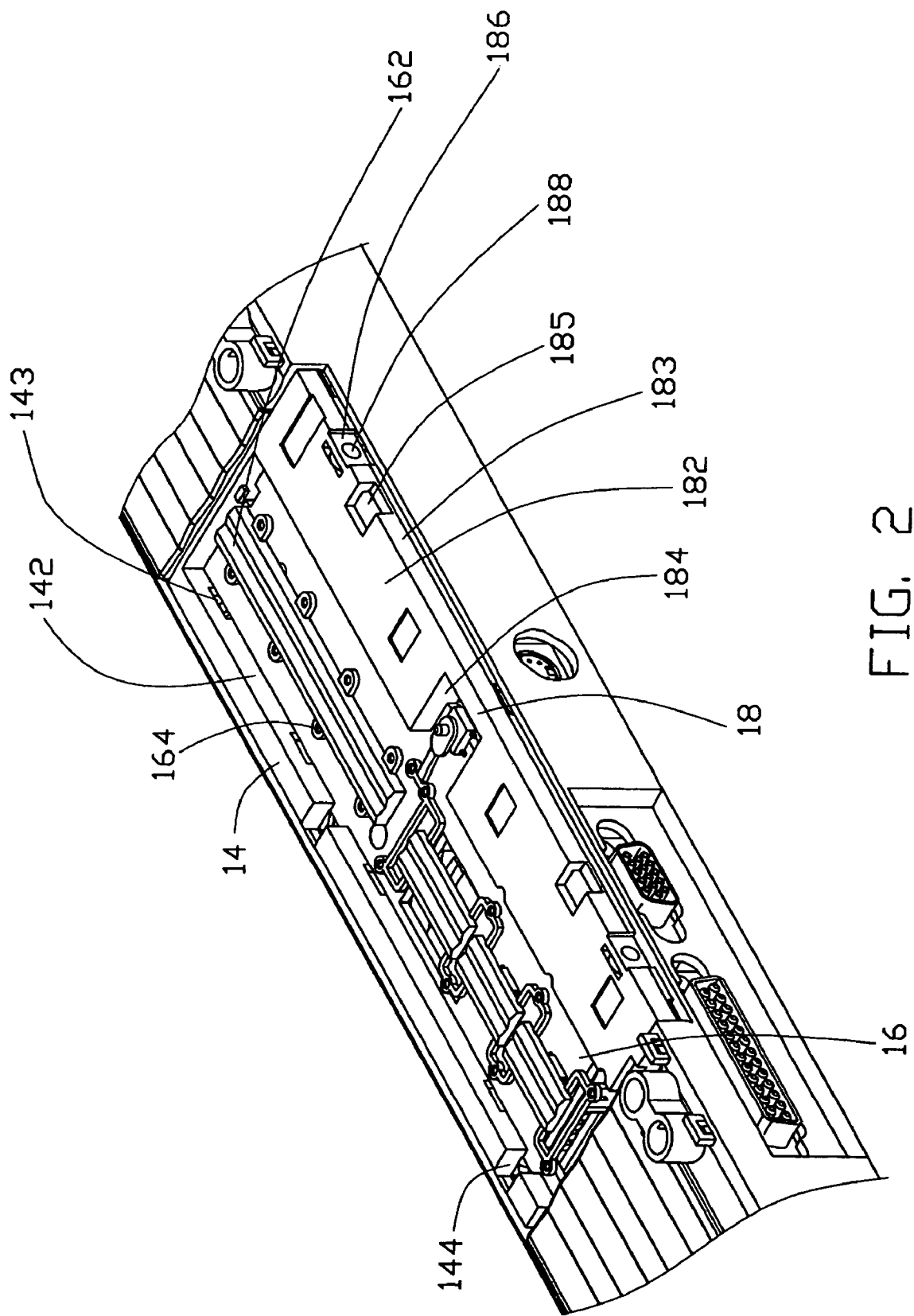
FIG. 2 is an enlarged view of a part of the chassis of the mounting system of FIG. 1.

Referring to FIGS. 1 and 2, a keyboard mounting system in accordance with the preferred embodiment of the present invention comprises a chassis 10 of a portable computer such as a notebook computer, a keyboard 20 attached to a middle portion of the chassis 10, a panel 30 attached to a rear portion of the chassis 10, a retaining member 40 attached to a rear edge portion 18 of the chassis 10, and a pair of fasteners such as screws 100 fastening the retaining member 40 to the chassis 10.

The chassis 10 defines a first recessed portion 12 in a middle section thereof for receiving the keyboard 20 therein, and a second recessed portion 16 in a rear section thereof for receiving the panel 30 therein. A plurality of locating holes 122 is defined in the chassis 10 at a front side of the first recessed portion 12. A rectangular recess 124 is defined in a front section of the first recessed portion 12. A narrow opening 126 is defined in the front section of the first recessed portion 12, below and in communication with the recess 124. A plurality of aligned buttons 162 is located in the second recessed portion 16. A plurality of spaced positioning holes 164 is defined adjacent the buttons 162.

A bar 14 extends along a front longitudinal side of the second recessed portion 16. Two spaced gaps 144 are defined in the bar 14. The bar 14 has a vertical rear face 142 facing an interior of the second recessed portion 16. A plurality of apertures 143 is defined in a bottom of the rear face 142.

The chassis 10 comprises a flat rear edge portion 18 extending along a rear longitudinal side of the second recessed portion 16. The rear edge portion 18 is slightly recessed with respect to a top face of the chassis 10. The rear edge portion 18 has a horizontal top wall 182 and a vertical rear wall 183. A positioning slot 184 is defined in the top wall 182, in communication with the second recessed portion 16. A pair of spaced latch slots 185 is defined in the rear edge portion 18 in a junction of the top wall 182 and the rear wall 183. A pair of spaced indented portions 186 is defined in the rear wall 183, adjacent the latch slots 183 respectively. A threaded hole 188 is defined in each indented portion 186.

The chassis 10 further comprises a rear outer side 17 having a plurality of input/output (I/O) ports (not labeled) provided therein.

Figure 3:
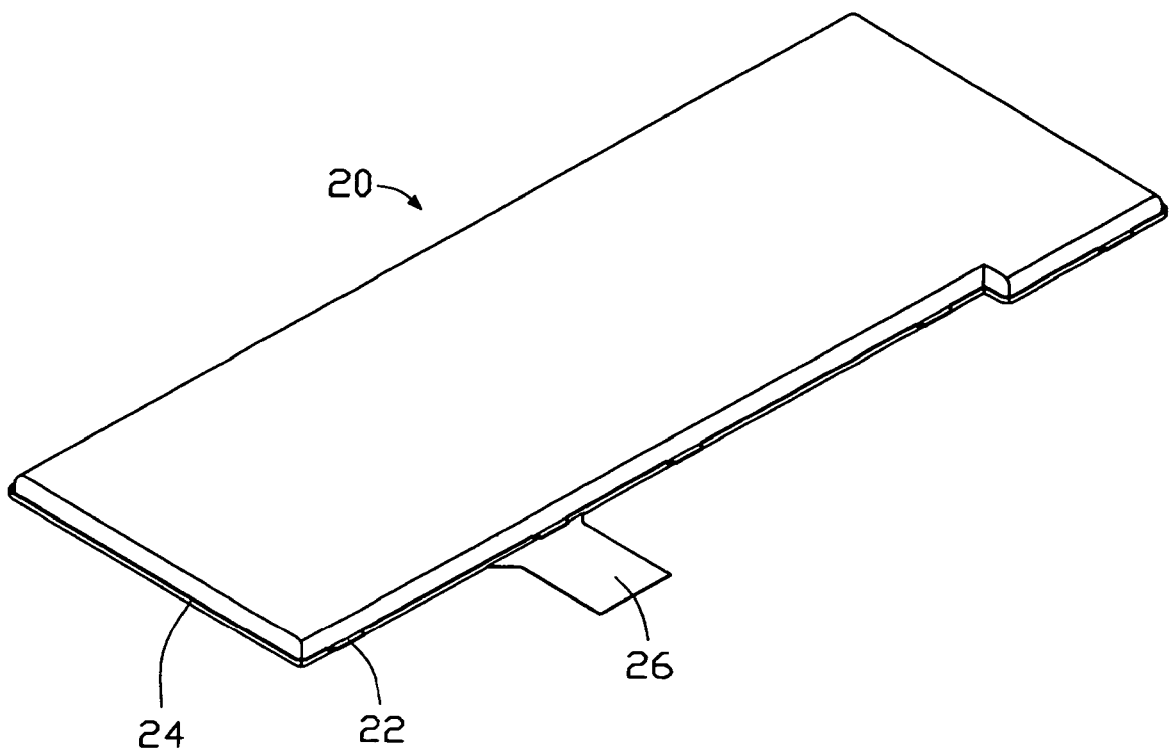
FIG. 3 is an enlarged view of the keyboard of the mounting system of FIG. 1, but viewed from another aspect.

Referring to FIG. 3, the keyboard 20 forms a peripheral lip 24 around a bottom portion thereof. A plurality of protrusions 22 extends forwardly from the front side of the keyboard 20, corresponding to the locating holes 122 respectively.

A flat cable 26 is for connecting the keyboard 20 to a motherboard (not shown) which is located under the first recessed portion 12. The flat cable 26 connects to the keyboard 20 via a connector (not shown). When the keyboard 20 is received in the first recessed portion 12, the cable 26 extends through the narrow opening 126 at the recess 124, and the connector is received in the recess 124.

Figure 4:
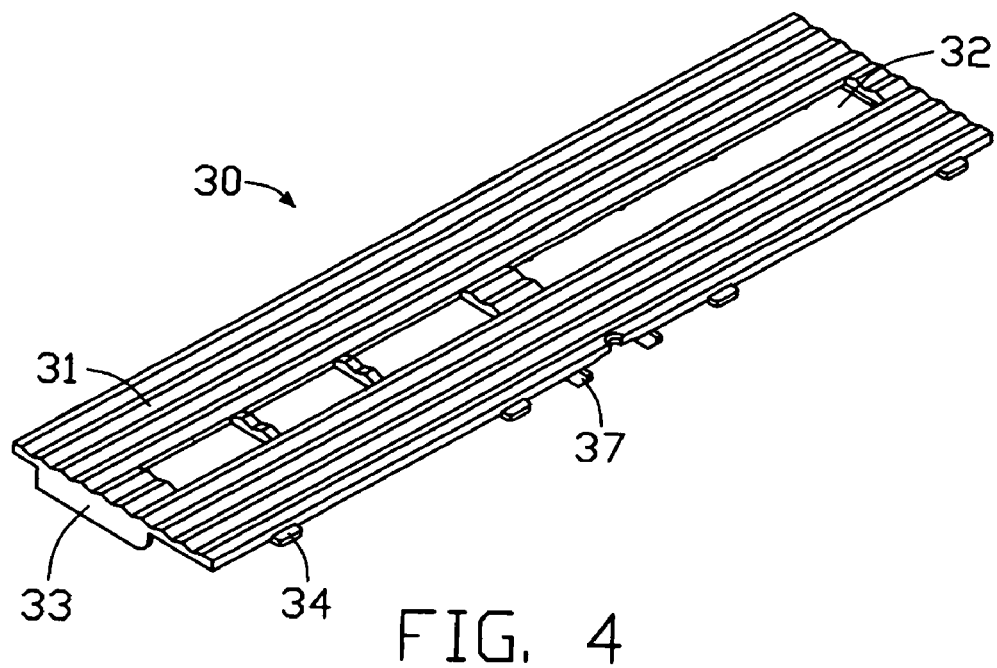
FIG. 4 is an enlarged view of the panel of the mounting system of FIG. 1.
Figure 5:
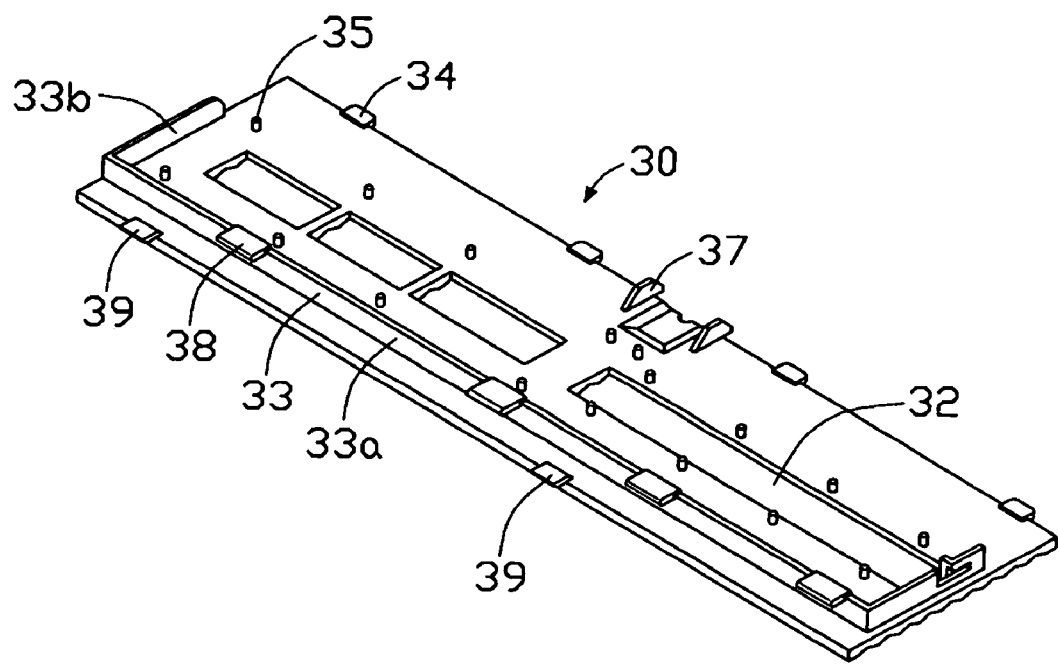
FIG. 5 is similar to FIG. 4, but showing the panel inverted.

Referring to FIGS. 4 and 5, the panel 30 comprises a main body 31, and a generally U-shaped rib 33 depending from the main body 31. A plurality of through slots 32 is defined in the main body 31, for receiving the buttons 162 of the second recessed portion 16 therein. A plurality of positioning posts 35 depends from the main body 31, corresponding to the positioning holes 164 of the second recessed portion 16. Two stop tabs 39 extend forwardly from a front underside of the main body 31, corresponding to the gaps 144 of the bar 14. A plurality of projections 34 extends rearward from a rear side of the main body 31. A pair of parallel positioning tabs 37 depends from a rear underside of the main body 31, corresponding to the positioning slot 184.

The rib 33 comprises a transverse wall 33a, and a pair of lateral walls 33b extending perpendicularly from opposite ends of the transverse wall 33a respectively. A plurality of ears 38 extends forwardly from a bottom edge of the transverse wall 33a, corresponding to the apertures 143 of the bar 14.

Figure 6:
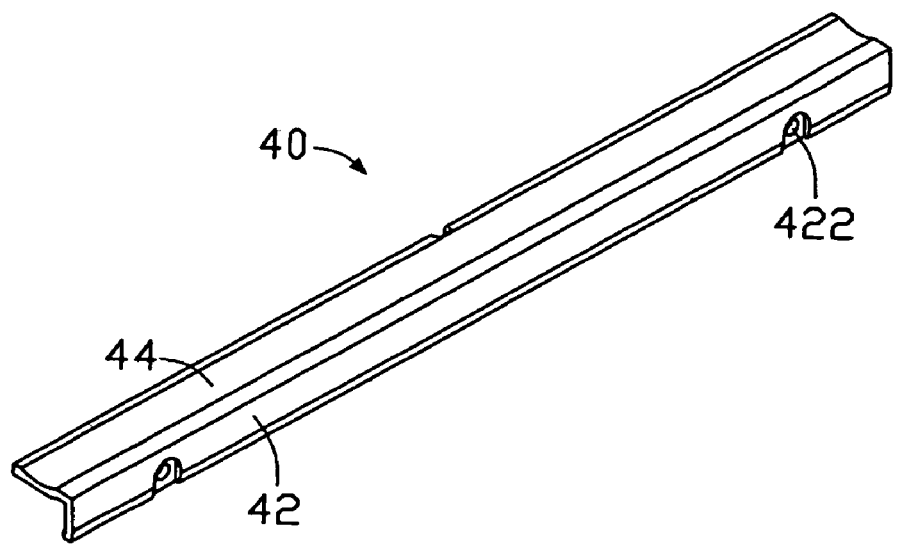
FIG. 6 is an enlarged view of the retaining member of the mounting system of FIG. 1.
Figure 7:
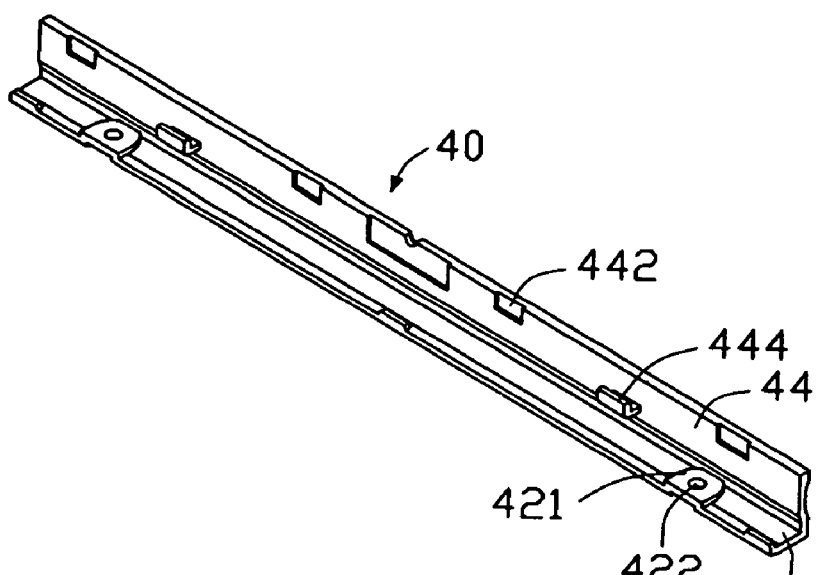
FIG. 7 is similar to FIG. 6, but showing the retaining member inverted.
Figure 8:
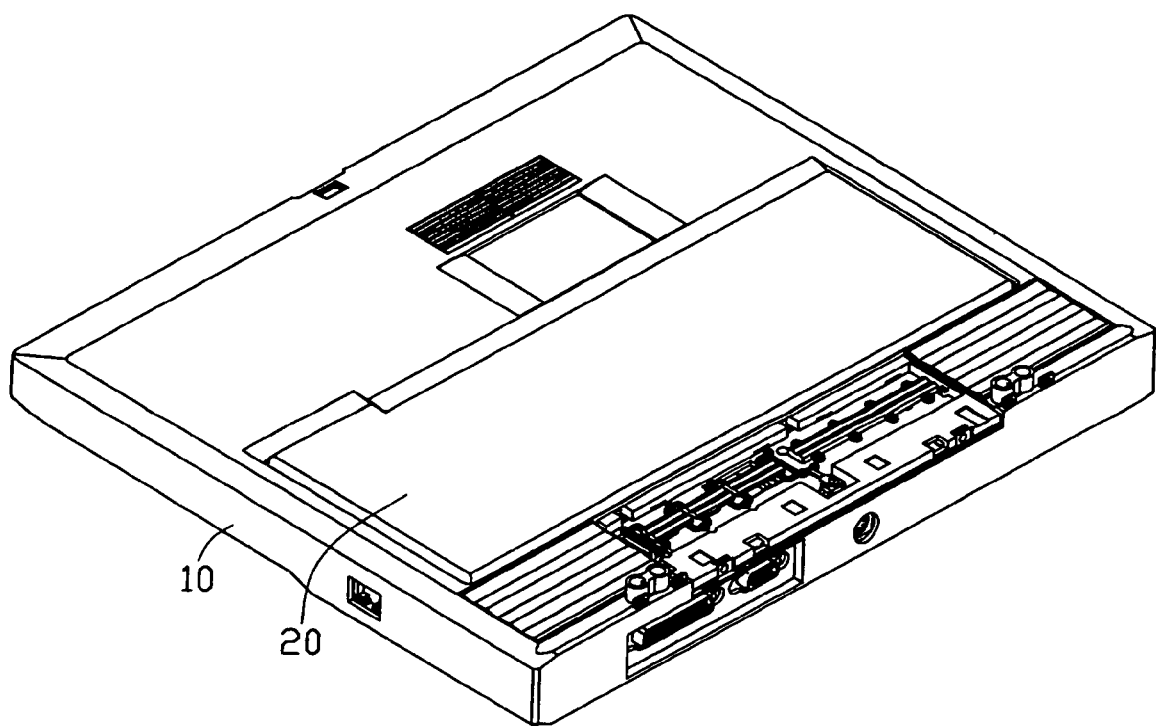
FIG. 8 is a partly assembled view of FIG. 1, not including the panel, the retaining member or the fasteners.
Figure 9:
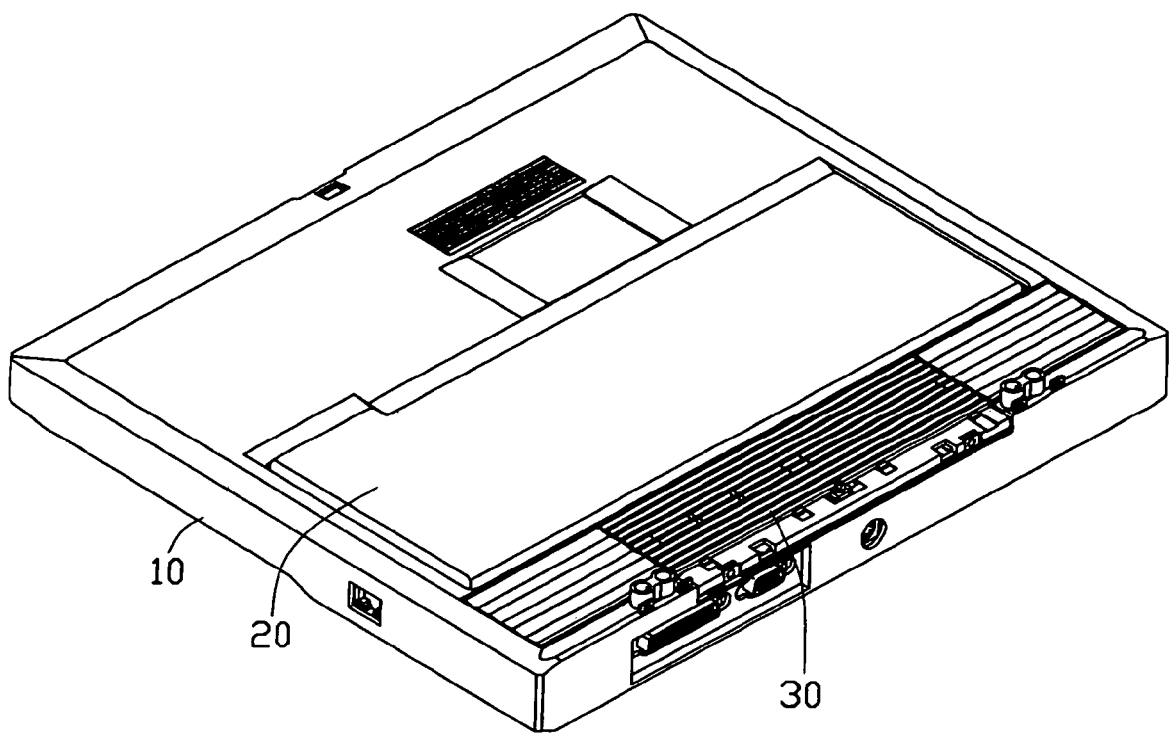
FIG. 9 is a more fully assembled view of FIG. 1, not including the fasteners.
Figure 10:
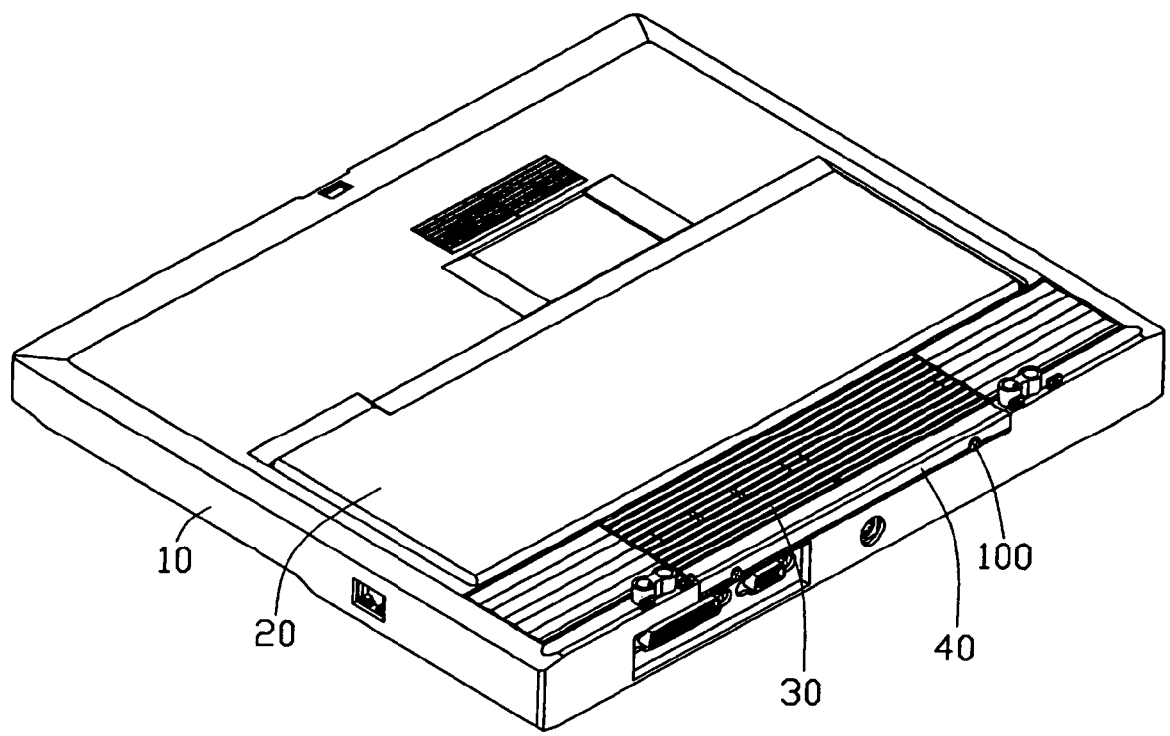
FIG. 10 is a fully assembled view of FIG. 1.
Figure 11:
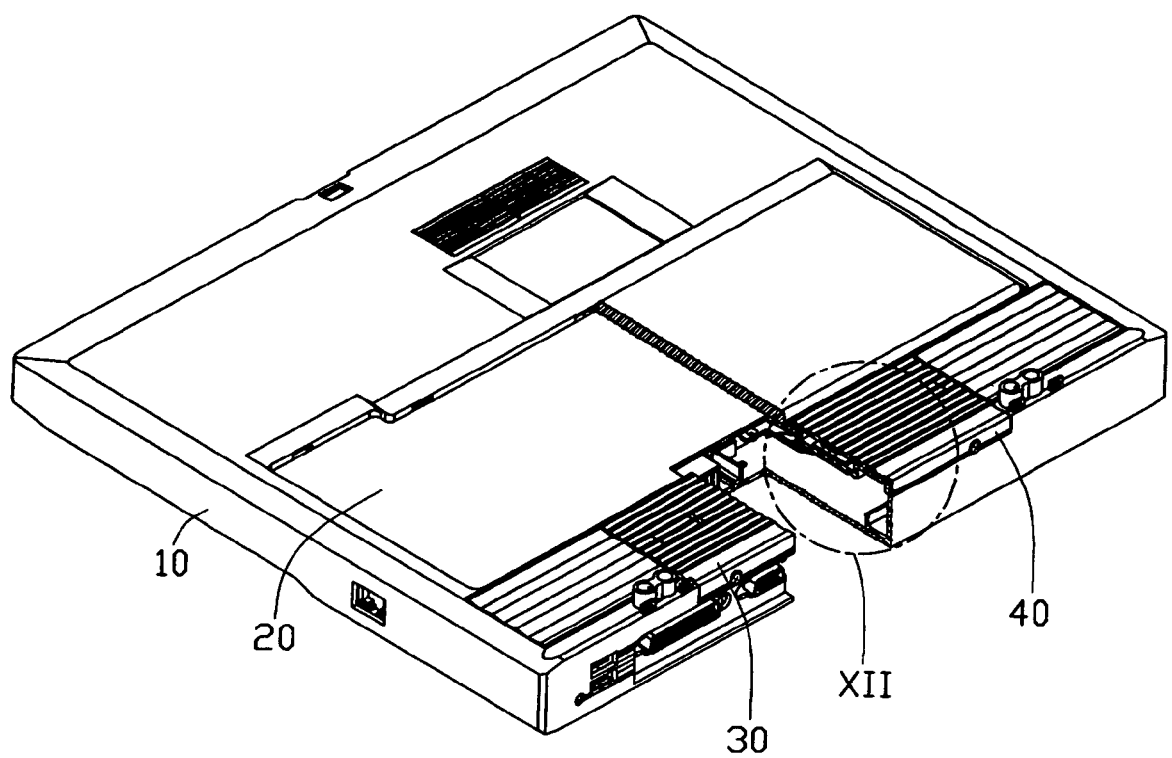
FIG. 11 is similar to FIG. 10, but with a portion of the mounting system cut away.
Figure 12:
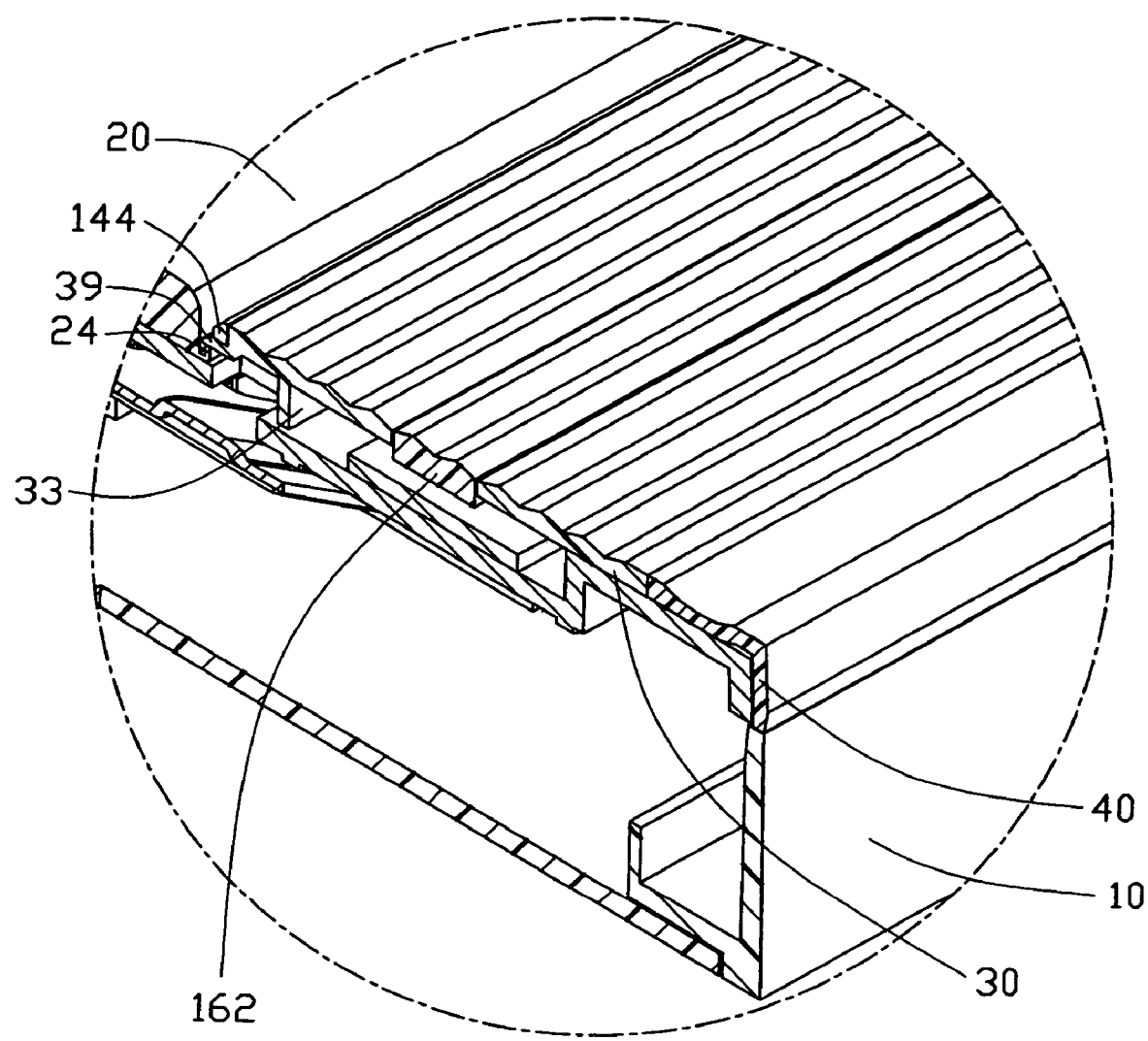
FIG. 12 is an enlarged view of an encircled portion XII of FIG. 11.

Referring to FIGS. 6 and 7, the retaining member 40 has an L-shaped cross-section. The retaining member 40 comprises a first beam 42, and a second beam 44 bent at a right angle to the first beam 42. Portions of the first beam 42 are stamped inwardly to form two inward bumps 421 (shown in FIG. 7), corresponding to the indented portions 186 of the rear edge portion 18 of the chassis 10. A through hole 422 is defined in each bump 421, corresponding to a respective threaded hole 188 of the chassis 10. A plurality of cavities 442 is defined in a front underside of the second beam 44, for receiving the projections 34 of the panel 30 therein. A pair of latches 444 extends from an underside of the second beam 44, corresponding to the latch slots 185 of the rear edge portion 18.

Referring to FIGS. 8 through 12, in assembly, the flat cable 26 is extended through the narrow opening 124 of the first recessed portion 12 and connected to the connector of the keyboard 20. The keyboard 20 is placed in the first recessed portion 12, with the protrusions 22 of the keyboard 20 engaged in the locating holes 122 of the chassis 10, and the connector received in the recess 124.

The panel 30 is obliquely disposed above the second recessed portion 16, with the ears 38 of the rib 33 of the panel 30 aligned with the apertures 143 of the bar 14. The panel 30 is pushed forwardly to enable the ears 38 to engage in the apertures 143. The panel 30 is rotated slightly downward so that the positioning posts 35 are engaged in the positioning holes 164, and the positioning tabs 37 are engaged with the rear edge portion 18 of the chassis 10 at opposite sides of the positioning slot 184. The panel 30 is thus fully received in the second recessed portion 16, with the transverse wall 33a of the rib 32 abutting the vertical rear face 142 of the bar 14, and the lateral walls 33b of the rib 32 abutting the chassis 10 at opposite ends of the second recessed portion 16. The through openings 32 of the panel 30 movably receive the buttons 162 therein. The stop tabs 39 of the panel 30 extend through the gaps 144 of the bar 14 to engage with a top edge of the peripheral lip 24 of the keyboard 20.

The retaining member 40 is then placed above the rear edge portion 18. The latches 444 are extended into the latch slots 185. The retaining member 40 is pushed forwardly to enable the latches 444 to abut the rear edge portion 18 in the respective latch slots 185. The projections 34 of the panel 30 are thus received in the cavities 442 of the second beam 44 respectively. Simultaneously, the indented portions 186 of the rear edge portion 18 receive the bumps 421 of the first beam 42 therein, with the threaded holes 188 being aligned with the through holes 422. The screws 100 are extended through the through holes 422 and engaged in the threaded holes 188. Thus, the retaining member 40 is secured to the rear edge portion 18.

The engagement of the projections 34 of the panel 30 in the cavities 442 of the retaining member 40 is fixed once the retaining member 40 is secured to the chassis 10. The ears 38 engaged in the apertures 143 of the bar 14 and the projections 34 engaged in the cavities 442 thus cooperatively retain the panel 30 in the second recessed portion 16. The engagement of the stop tabs 39 of the panel 30 and the peripheral lip 24 of the keyboard 30 is also fixed once the panel 30 is retained in place. The protrusions 22 engaged in the locating holes 122 and the peripheral lip 24 engaged with the stop tabs 39 thus cooperatively retain the keyboard 20 in the first recessed portion 12.

In the present invention, the panel 30 and the retaining member 40 are modular parts of the portable computer. All the engaging means are formed on these modular parts. That is to say, no other elements are added to the chassis 10. The keyboard 20 is thus retained in the chassis 10 without making the structure of the chassis 10 unduly complicated.

It is understood that the invention may be embodied in other forms without departing from the spirit thereof. Thus, the present examples and embodiments are to be considered in all respects as illustrative and not restrictive, and the invention is not to be limited to the details given herein.

The invention claimed is:

1. A mounting system for a keyboard, comprising:
a chassis defining a recessed portion for receiving the keyboard therein, and another portion with a plurality of buttons arranged thereat;
a panel detachably attached to the chassis adjacent the recessed portion, and covering said another portion; and
a retaining member fixed to the chassis to retain the panel in place;
wherein interlocking devices are formed both at a side of the recessed portion opposing the panel and a side of the panel for engaging with opposite sides of the keyboard to thereby retain the keyboard in the recessed portion.

2. The mounting system as described in claim 1, wherein the keyboard comprises a plurality of protrusions projecting outwardly from one of said sides thereof, and the interlocking devices comprise a plurality of locating holes engagingly receiving the protrusions therein.

3. The mounting system as described in claim 2, wherein the interlocking devices further comprise a stop tab extending from said side of the panel for engaging with a peripheral lip of the keyboard formed at an opposing one of said sides thereof.

4. The mounting system as described in claim 3, wherein said another portion is another recessed portion receiving the panel therein.

5. The mounting system as described in claim 4, wherein a bar is arranged along a longitudinal side of said another recessed portion, a gap is defined in the bar, and the stop tab of the panel extends through the gap to engage with the peripheral lip of the keyboard.

6. The mounting system as described in claim 5, wherein the bar defines a plurality of apertures in a bottom thereof, and the panel comprises a plurality of ears extending from said side thereof and engaging in the apertures.

7. The mounting system as described in claim 1, wherein the panel comprises a pair of positioning tabs depending from an opposite side thereof, and the chassis defines a positioning slot in a rear portion thereof, the positioning tabs being received in the positioning slot.

8. The mounting system as described in claim 7, wherein the panel comprises a plurality of projections extending from said opposite side thereof, and the retaining member comprises a first beam defining a plurality of cavities, the projections being engagingly received in the projections.

9. The mounting system as described in claim 8, wherein the retaining member comprises a pair of latches depending from the first beam, and the chassis defining a pair of latch slots in the rear portion thereof, the latch slots engagingly receiving the latches therein.

10. The mounting system as described in claim 8, wherein the retaining member further comprises a second beam extending integrally from the first beam, the second beam being fastened to a rear outer face of the chassis.

11. A portable computer system comprising:
a chassis defining first and second recessed portions;
a keyboard received in the first recessed portion with one side thereof detachably engaged with the chassis at one side of the first recessed portion; and
a panel retained in the second recessed portion, one side of the panel releasably engaged with an opposite side of the keyboard thereby retaining the keyboard in the first recessed portion.

12. The portable computer system as described in claim 11, wherein the keyboard comprises a plurality of protrusions at said one side thereof, and the chassis defines a plurality of locating holes at said one side of the first recessed portion, the protrusions being received in the locating holes.

13. The portable computer system as described in claim 11, wherein a bar extends between the first and second recessed portions, a plurality of apertures is defined in a bottom of the bar, and the panel comprises a plurality of ears at said side thereof, the ears being engagingly received in the apertures.

14. The portable computer system as described in claim 13, wherein the keyboard comprises a peripheral lip at a bottom portion thereof, the bar defines a gap therein, and the panel comprises a stop tab at said one side thereof, the stop tab extending through the gap to engage with the peripheral lip.

15. The portable computer system as described in claim 11, further comprising a retaining member having a generally L-shaped cross-section defined by a first beam and a second beam.

16. The portable computer system as described in claim 15, wherein the panel comprises a plurality of projections at an opposite side thereof, and the second beam of the retaining member defines a plurality of cavities engagingly receiving the projections therein.

17. The portable computer system as described in claim 15, wherein the first beam of the retaining member is fastened to a rear outer face of the chassis.

18. A portable computer system comprising:
a chassis defining first and second recesses side by side arranged with each other;
a keyboard received in the first recess and defining opposite front and rear sides;
means on the front side for locking to the chassis;
a panel received in the second recess, said panel defining opposite front and rear faces;
a first retention device formed on panel for retaining the panel in the second recess, and a second retention device formed on the front face for locking to the rear side of the keyboard; wherein
said keyboard can not be removed from the first recess unless the panel has been first removed from the second recess.

19. The system as described in claim 18, wherein said panel extends with most dimensions of said chassis in a longitudinal direction thereof and covers some parts of the computer system thereunder.

20. The system as described in claim 18, wherein said first retention device is located on the front face.

* * * * *